(12) United States Patent
Gantert

(10) Patent No.: US 10,482,449 B1
(45) Date of Patent: Nov. 19, 2019

(54) PERSON TO PERSON PAYMENT SYSTEM AND METHOD

(71) Applicant: JPMorgan Chase Bank, N.A., New York, NY (US)

(72) Inventor: Brian Gantert, Hockessin, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 119 days.

(21) Appl. No.: 14/202,765

(22) Filed: Mar. 10, 2014

(51) Int. Cl.
| | |
|---|---|
| *G06Q 20/02* | (2012.01) |
| *G06Q 20/22* | (2012.01) |
| *G06Q 20/40* | (2012.01) |

(52) U.S. Cl.
CPC ........... *G06Q 20/223* (2013.01); *G06Q 20/02* (2013.01); *G06Q 20/4018* (2013.01)

(58) Field of Classification Search
CPC ............................... G06Q 40/00; G06Q 30/00
USPC ........................................................... 705/40
See application file for complete search history.

(56) References Cited

U.S. PATENT DOCUMENTS

| | | | |
|---|---|---|---|
| 7,031,939 | B1 | 4/2006 | Gallagher et al. |
| 7,376,587 | B1 | 5/2008 | Neofytides et al. |
| 7,606,734 | B2 | 10/2009 | Baig et al. |
| 7,844,546 | B2 | 11/2010 | Fleishman et al. |
| 7,930,216 | B2 | 4/2011 | Neofytides et al. |
| 8,566,169 | B2 | 10/2013 | Bohanan et al. |
| 8,639,621 | B1 | 1/2014 | Ellis et al. |
| 8,725,635 | B2 | 5/2014 | Klein et al. |
| 8,768,838 | B1 * | 7/2014 | Hoffman ................ G06Q 40/00 705/44 |

(Continued)

OTHER PUBLICATIONS

"Peer to Peer Payments Survey" May 2013 by Ruth Susswein (Year: 2013).*

(Continued)

*Primary Examiner* — Bruce I Ebersman
(74) *Attorney, Agent, or Firm* — Greenberg Traurig LLP

(57) ABSTRACT

The invention relates to a computer-implemented system and method for sending a person to person (P2P) payment to a recipient, according to one example. The method may be conducted on a specially programmed computer system comprising one or more computer processors, mobile devices, electronic storage devices, and networks. The method may comprise the steps of: sending to the recipient electronically a notification of the payment from the sender, the notification including an amount of the payment; sending to the recipient electronically an indication of at least two of the following payment options: payment to a deposit account, payment to a transaction card account, payment to a third party P2P system, and payment in the form of a merchant electronic gift certificate; receiving from the recipient electronically a selection as to one of the payment options, including: (a) in the case of a deposit account, a routing number and account number, (b) in the case of a transaction card account, a card number, expiration date, and a card verification value (CVV), (c) in the case of a third party P2P system, an account identifier, or (d) in the case of a merchant electronic gift certificate, the merchant; and sending the payment electronically to the recipient via the recipient's selected payment option without requiring the recipient to open a new account or verify an existing account.

11 Claims, 7 Drawing Sheets

(56) References Cited

U.S. PATENT DOCUMENTS

| | | |
|---|---|---|
| 8,985,442 B1 | 3/2015 | Zhou et al. |
| 9,165,294 B2 * | 10/2015 | Sharma ................ G06Q 20/346 |
| 9,224,141 B1 | 12/2015 | Lamba |
| 9,852,417 B2 * | 12/2017 | Tyler ................ G06Q 20/3226 |
| 10,074,081 B1 * | 9/2018 | Radlow ................ G06Q 20/349 |
| 2002/0052841 A1 | 5/2002 | Guthrie et al. |
| 2002/0055835 A1 | 5/2002 | Carcoba Olivares et al. |
| 2007/0255620 A1 | 11/2007 | Tumminaro et al. |
| 2007/0255653 A1 | 11/2007 | Tumminaro et al. |
| 2008/0270304 A1 | 10/2008 | Brown |
| 2008/0313047 A1 | 12/2008 | Casares et al. |
| 2009/0271287 A1 * | 10/2009 | Halpern ................ G06Q 20/10 705/26.1 |
| 2010/0042538 A1 | 2/2010 | Dheer et al. |
| 2010/0042539 A1 * | 2/2010 | Dheer ................ G06Q 20/10 705/40 |
| 2010/0078472 A1 | 4/2010 | Lin |
| 2010/0125495 A1 | 5/2010 | Smith et al. |
| 2010/0145861 A1 | 6/2010 | Law et al. |
| 2010/0161485 A1 | 6/2010 | Bulawa et al. |
| 2010/0250375 A1 | 9/2010 | Diehl |
| 2011/0178902 A1 | 7/2011 | Imrey et al. |
| 2011/0264583 A1 | 10/2011 | Cooper et al. |
| 2012/0078751 A1 | 3/2012 | MacPhail |
| 2012/0084205 A1 | 4/2012 | Dheer et al. |
| 2012/0259772 A1 | 10/2012 | Lee |
| 2012/0284175 A1 | 11/2012 | Wilson et al. |
| 2013/0018787 A1 | 1/2013 | Andrews et al. |
| 2013/0036051 A1 | 2/2013 | Giordano |
| 2013/0103578 A1 * | 4/2013 | Mallean ................ G06Q 30/02 705/39 |
| 2013/0166332 A1 | 6/2013 | Hammad |
| 2013/0198061 A1 | 8/2013 | Dheer et al. |
| 2013/0212004 A1 * | 8/2013 | Itwaru ................ G06Q 50/01 705/39 |
| 2013/0218769 A1 | 8/2013 | Pourfallah et al. |
| 2014/0058939 A1 | 2/2014 | Savla |
| 2014/0122328 A1 | 5/2014 | Grigg |
| 2014/0129428 A1 | 5/2014 | Tyler et al. |
| 2014/0244493 A1 | 8/2014 | Kenyon et al. |
| 2015/0248664 A1 | 9/2015 | Makhdumi |

OTHER PUBLICATIONS

Fuscaldo, Donna, Peer-to-Peer Payments Gain Momentum. FOX Business: Small Business Center [serialonline], [retrieved on Feb. 4, 2015]. Retrieved from the Internet <URL: https://web.archive.org/web/20110203073603/http://smallbusiness.foxbusiness.com/sbc/2010/06/17/say-goodbye-checks-peer-peer-payments-gain-momentum/>.

Windh, Jennifer. Peer-to-Peer Payments: Surveying a rapidly changing landscape. Federal Reserve Bank of Atlanta [online], Aug. 15, 2011 [retrieved on Feb. 4, 2015]. Retrieved from the Internet< URL: www.frbatlanta.us/documents/rprf/rprf_pubs/110815_wp.pdf.>.

* cited by examiner

PERSON TO PERSON PAYMENT SYSTEM AND METHOD

FIELD OF THE INVENTION

The invention relates generally to a system and method for facilitating person to person payment transactions, and more particularly to a system and method for facilitating the process of receiving a person to person payment.

BACKGROUND

Person to person (P2P) payment systems allow an individual to send money electronically with his or her computer or mobile device to another person. Once the sender's P2P account has been established and the P2P recipients have been identified, the P2P system offers the convenience of being able to send money electronically to another person by following a few steps. The sender authenticates (e.g., via log in, pin, or biometric authentication) to his or her account, elects to make a P2P payment, enters the payment amount and payment date, enters and/or selects a recipient (via a list of pre-defined P2P recipients or by entering contact information for a new recipient), selects a method of notification, and then takes an action (such as hitting a button) to trigger or initiate sending of the payment.

If the recipient has a P2P account with the same bank or P2P payment service, the process for the recipient can be completed with a few steps in a short period of time. The recipient receives a notification by email or text, authenticates to his or her account, accepts the money (or has it automatically deposited without the need to accept the money), and receives a confirmation that the payment has been deposited into his or her account.

The experience for the recipient, however, can be significantly more cumbersome if he or she does not have a P2P account with the same bank or P2P payment service as the sender. In this case, the recipient must enroll for a P2P recipient account with the sender's bank or P2P payment service, which typically involves many steps and can take a number of days. The recipient first must go to a P2P website of the sender's bank or P2P payment service and input his or her personal information including name and contact information such as address, phone number, and email address. The P2P system then verifies the recipient's contact information (e.g., by texting a verification code to the recipient's mobile device or by sending a verification code to the recipient by email) and asking the recipient to confirm his or her identity. The process may also require the recipient to answer security questions. After the sender's P2P system has verified the recipient's identity, the recipient must then register and verify his or her receiving bank account. This account verification process requires the recipient to enter the routing number and the account number, which generally means that the recipient must have his or her checkbook and identify the routing number and account number within the MICR line at the bottom of the check. The recipient then specifies whether the account is a checking account or savings account, personal or business, and the name of the bank. The sender's P2P system typically performs an account verification (solutions include depositing two small payments into the account, which may take a few business days for the deposits to show up on the account and to verify the deposit amounts for the P2P account registration). In all, the process from the recipient's perspective may be prohibitively slow and involved, particularly if it is all just to receive a small payment (e.g., $10 reimbursement to your friend who paid for lunch). These and other drawbacks have imposed significant limitations on the adoption of P2P payment systems.

SUMMARY

According to one embodiment, the invention relates to a computer-implemented system and method for sending a person to person (P2P) payment to a recipient. The method may be conducted on a specially programmed computer system comprising one or more computer processors, mobile devices, electronic storage devices, and networks. The method may comprise the steps of sending to the recipient electronically a notification of the payment from the sender, the notification including an amount of the payment; sending to the recipient electronically an indication of at least two of the following payment options from which the recipient can choose to receive their funds: payment to a deposit account, payment to a transaction card account, payment to a third party P2P system, and payment in the form of a merchant electronic gift certificate; receiving from the recipient electronically a selection as to one of the payment options, including: (a) in the case of a deposit account, a routing number and account number, (b) in the case of a transaction card account, a card number, expiration date, and a card verification value (CVV), (c) in the case of a third party P2P system, an account identifier, or (d) in the case of a merchant electronic gift certificate, the merchant; and sending the payment electronically to the recipient via the recipient's selected payment option without requiring the recipient to open a new account or verify an existing account.

The invention also relates to a computer implemented system for sending a P2P payment to a recipient, and software stored on a computer storage device for sending a P2P payment to a recipient.

The computer implemented system and method described herein can provide the advantage of expediting and facilitating to a significant extent the process for a recipient to receive a P2P payment, according to various embodiment of the invention. For example, the system and method may allow the recipient to receive the payment by simply identifying an existing account without going through a prolonged verification process, or by identifying a desired merchant electronic gift certificate. Consequently, various embodiments of the invention can be used to promote more widespread adoption of P2P systems by facilitating the payment receiving process. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENTS

Figure 1:
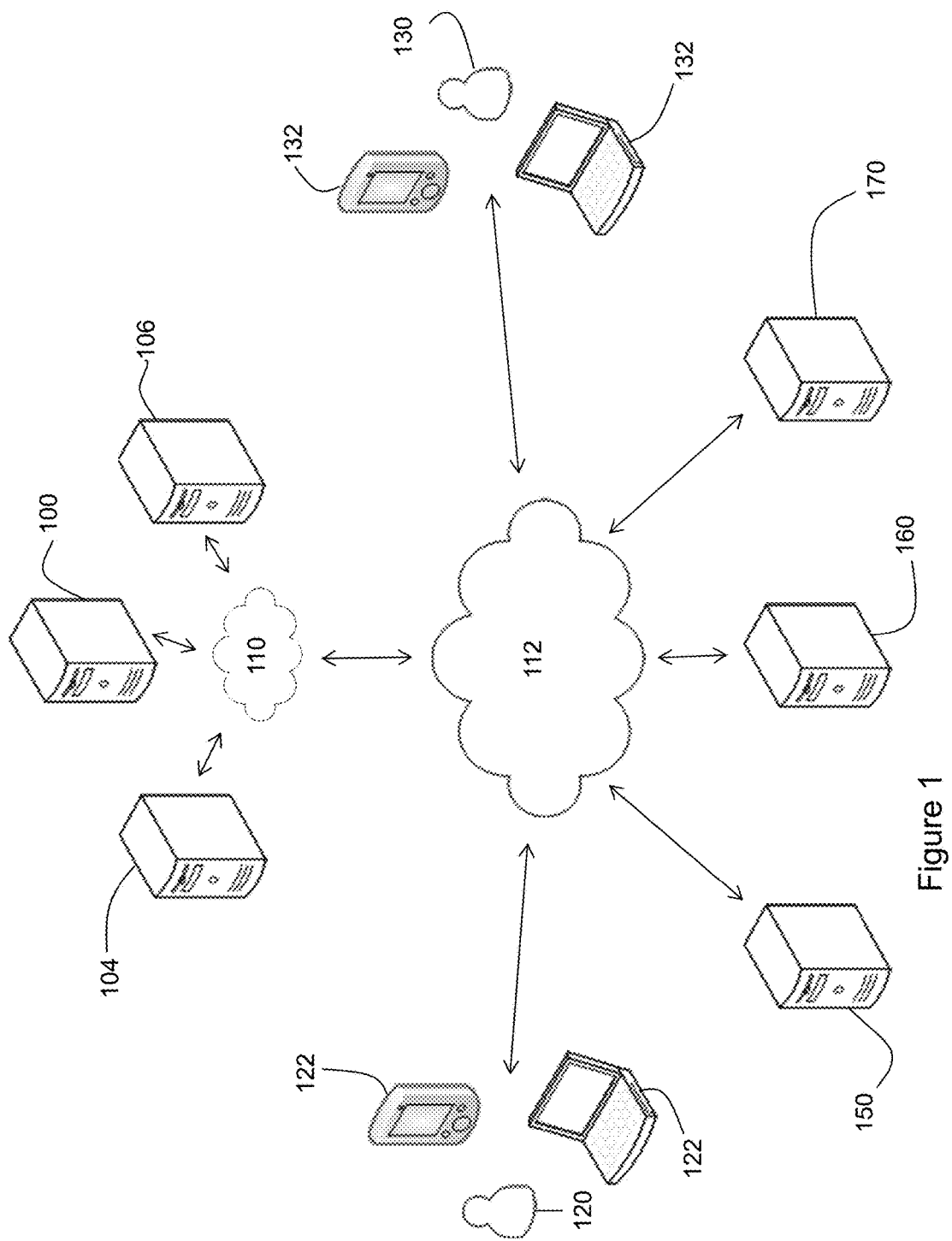
FIG. 1 is a drawing of a system for sending and receiving P2P payments according to one embodiment of the invention.

FIG. 1 is a diagram of a system for executing person to person (P2P) payment transactions according to one embodiment of the invention. As shown in FIG. 1, the system may include one or more computer servers and networks. The system enables a sender 120 to send money electronically with his or her personal computing device 122 to the personal computing device 132 of a recipient 130. The personal computing device 122, 132 may be a mobile device such as the iPhone or Android, a tablet computer, such as the iPad, a laptop computer, a desktop computer, or other type of personal computing device, for example.

The P2P payment system may be provided by a financial institution such as retail bank, according to one embodiment of the invention. The P2P payment system may be embodied primarily or entirely in a server 100 operated by the bank that interfaces with a number of other servers via one or more networks. As will be described in more detail below, the P2P server 100 may interface with other servers operated by the bank, such as a source account server 104 that maintains accounts (e.g., checking account, savings account, stored value account, or other deposit account) for the bank's account holders, and a card processing server 106 that maintains transaction card accounts (e.g., credit card accounts and debit card accounts) for the bank's transaction card holders.

The P2P system 100 may also interface with third party systems. For example, the P2P server 100 may interface through networks 110, 112 with a merchant electronic gift certificate server 150 operated by a merchant that accepts electronic gift certificates such as Starbucks or Amazon, a P2P server 160 operated by a third party P2P platform such as PayPal or Dwolla, and a deposit account server 170 operated by a different retail bank. The networks 110, 112 enable communications between various computing devices and storage devices in the system. The networks 110, 112 may comprise one or more of the Internet, a wide area network (WAN), a local area network (LAN), and/or an intranet, according to various embodiments of the invention.

Figure 2:
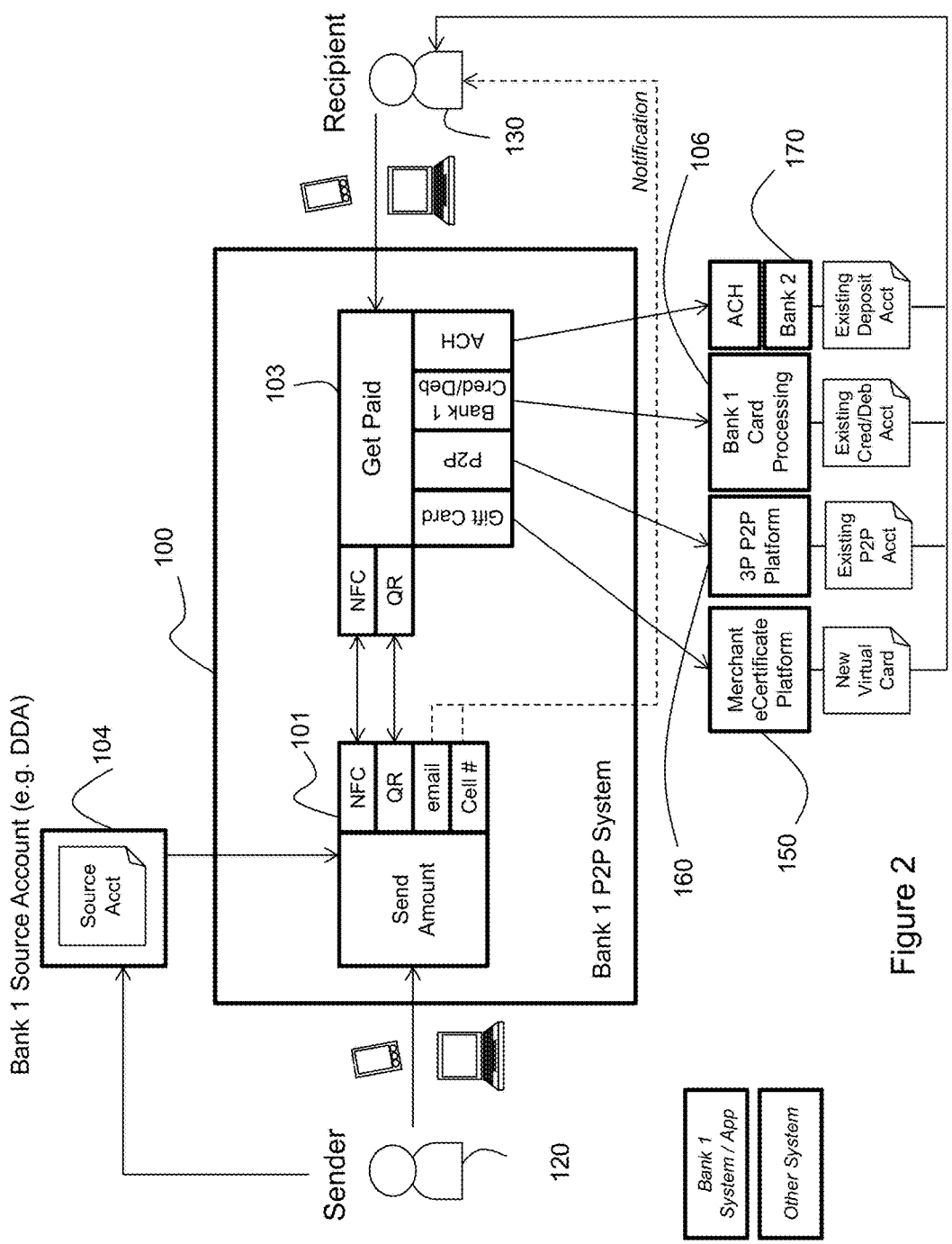
FIG. 2 is an architecture diagram showing a number of different P2P payment channels and communication channels according to an exemplary embodiment of the invention.

FIG. 2 is a diagram showing a number of components of the P2P system 100 according to an exemplary embodiment of the invention. The P2P system 100 provides the sender 120 with a number of options for sending money to a recipient 130. As shown in FIG. 2, the P2P server 100 includes a send module 101 for enabling the sender 120 to send payments to a recipient 130. The sender (which may also be referred to as a payor) 120 can send money to the recipient (which may also be referred to as a payee) 130 by specifying near field communication (NFC), quick response (QR) code, an email address of the recipient, a mobile phone number of the recipient, or other communication method (e.g., Bluetooth Low Energy, biometric authentication, or via social networks such as Facebook). The send module 101 may comprise one or more software modules residing on the P2P server 100 that enable communication with the sender's personal computing device 122, for example.

Figure 3:
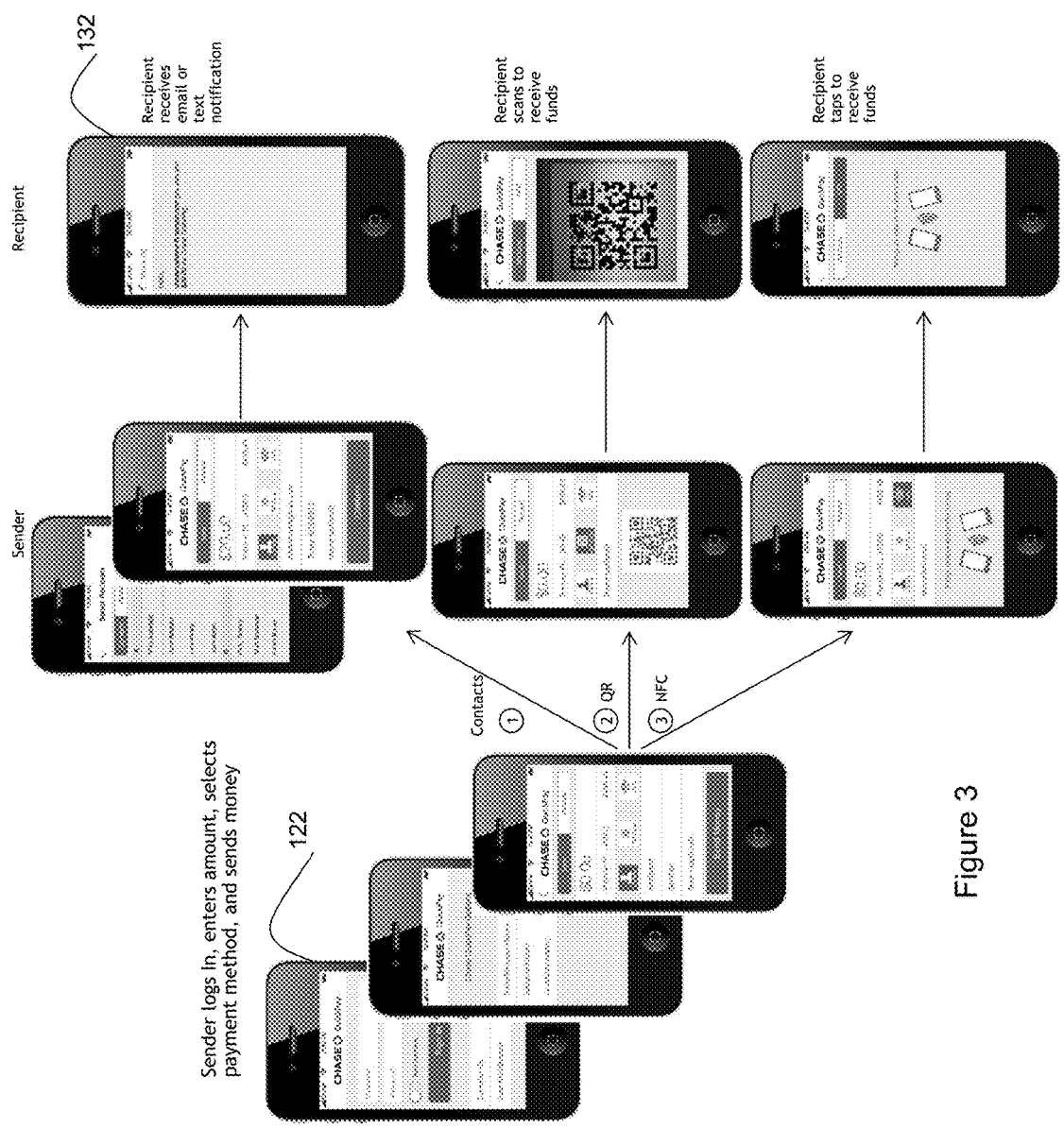
FIG. 3 illustrates an example of a user interface for a sender of a P2P payment using his or her personal computing device.

FIG. 3 illustrates an example of a P2P user interface displayed on the sender's personal computing device 122 that the sender 120 can use to send a P2P payment to a recipient. As shown in FIG. 3, the sender authenticates to his or her P2P account by entering a username and password, personal identification number (PIN), biometric data, or other authentication method). Initially, the user interface allows the sender to register one or more accounts with the bank (e.g., demand deposit accounts) from which to draw money for sending, and for receiving payments from other people. The sender can specify, for example, a default account for sending P2P payments and for receiving P2P payments. As shown in FIG. 3, the user interface allows the sender 120 to elect to send or request money, receive money, or view his or her P2P account history. If the sender chooses to send money, he or she enters the amount of the payment and the desired payment date. The user interface also allows the sender to choose between contact information (e.g., email address or mobile phone number), QR code, or NFC as the method for sending the communication to the recipient regarding the payment.

If the sender elects to use contact information to communicate with the recipient, the P2P user interface may use and display existing contact information stored in the sender's personal computing device as their list of "contacts." That is, according to one embodiment of the invention, the user interface for the P2P system 100 does not require the sender to specifically add contact information (e.g., mobile phone number and email address) for potential P2P payment recipients, but rather can simply use existing contact information stored in the sender's device for other communications (e.g., contacts from Microsoft Outlook or other email program, or "Recents" or "Favorites" or "Contacts" from the user's iPhone). For example, by hitting the "contacts" button in the P2P application, the sender's complete list of contacts appears, and the sender can then select a contact and choose whether to communicate by email or by text (mobile phone number). The P2P system 100 may utilize an application programming interface (API) to directly access the user's Contacts, Recents, and Favorites, for example. This feature enables the P2P system to eliminate the need for the user to enter or register a duplicate set of contacts specifically for P2P payments. The P2P system may also include an optional "memo" line that allows the sender to enter a short message to be sent to the recipient with the payment notification.

After the sender has specified the payment amount, payment date, recipient contact information or QR code or NFC, and optionally a message in the memo field, the sender hits a confirmation button to initiate execution of the P2P payment. As shown in FIG. 3, if the sender has specified a contact with an email address or mobile phone number, the P2P system sends an email or text message, respectively, to the recipient informing the recipient that the sender has just sent the payment amount via the P2P system of the sender's bank. If the sender has specified QR code as the method of communication, the P2P user interface displays a QR code which can be scanned by a QR code reader on the recipient's personal computing device 132 to receive the funds. If the sender has specified NFC as the method of communication, the P2P user interface generates an NFC signal which can be detected and decoded by the recipient tapping his or her NFC enabled personal computing device 132 to the sender's personal computing device 122 to initiate the process for receiving the funds. In each case, according to an exemplary embodiment of the invention, the recipient 130 does not need to undergo any additional steps to accept the payment from the sender 120, such as logging in to the P2P system or establishing or verifying an account. According to one embodiment of the invention, if the money is sent via QR code or NFC, the system does not require that the recipient be identified or established upfront, i.e., prior to the QR code or NFC transmission. However, upon completion of the transaction, the system captures the recipient information and populates the sender's transaction history with the recipient information (e.g., name and address).

Referring again to FIG. 2, the P2P server 100 includes a receive module 103 for enabling the recipient 130 to receive payments from the sender 120. The receive module may comprise one or more software modules residing on the P2P server 100. According to a preferred embodiment of the invention, the receive module 103 includes features that facilitate and/or expedite the process followed by the recipient 130 for receiving a P2P payment from the sender 120.

If the sender 120 chooses to notify the recipient 130 by text or by email, the send module 101 sends the text or email message to the recipient's personal computing device 132. The message includes a link to an interface with the P2P receive module 103. For example, the message may include an internet http address that the recipient clicks on, which initiates a request to the receive module 103 to send a webpage to the recipient's personal computing device 132. The web page may present the recipient with a number of options for receiving the payment. The options may include, for example, receiving the payment by electronic gift certificate of a merchant (including mobile and/or electronic options such as via QR code, bar code, or merchant account number), a P2P account with the sender's bank or with a third party P2P service, a credit to the recipient's credit card account or deposit to the recipient's debit card account, or a deposit in the recipient's deposit account. The recipient gets to choose the merchant electronic gift certificate fulfillment method (e.g., merchant code or account number, QR code, bar code) and select from a list of available merchants.

Figure 4:
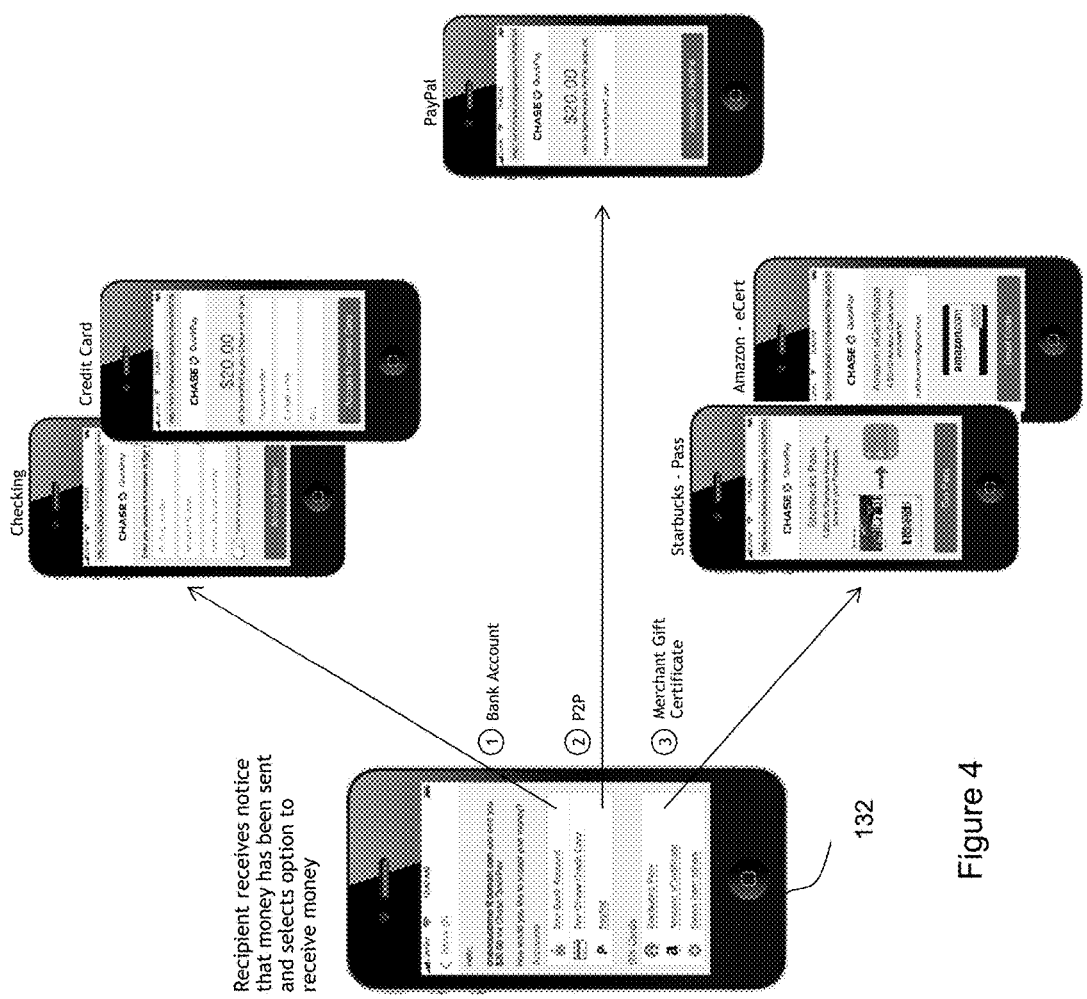
FIG. 4 is an example of a user interface for a recipient of a P2P payment using his or her personal computing device.

FIG. 4 illustrates an example of a user interface for presenting these options to the recipient. The user interface can be transmitted by the receive module 103 to the recipient's personal computing device 132, for example. The user interface may indicate that the sender, identified by name or email address, has sent a specified payment amount to the recipient via the P2P system of the sender's bank. The user interface may also ask the recipient how he or she would like to receive the money and present a number of options. The options may include, for example, receiving the payment into the recipient's deposit account (e.g., checking, savings, stored value), credit or debit card account, P2P service, or merchant gift certificate.

If the recipient elects to have the money deposited into his or her deposit account, the receive module 103 can execute an expedited process to deposit the money into that account. For example, the receive module 103 can query the recipient for his or her account number and routing number of the account in which the money is to be deposited. If the recipient is carrying his or her checkbook, these numbers are set forth within the MICR line at the bottom of each check. The receive module 103 may proceed with no additional account establishment or verification if the recipient is only receiving funds, and not sending funds, for example. According to one embodiment of the invention, the system will recognize that an account that does not go through full verification may not be eligible to send money until full verification is obtained. Once the recipient has entered the account number and routing number, he or she may hit "Accept Money" to complete the money transfer into his or her specified account. The account may be with the sender's bank or with another bank. The receive module 103 takes the account number, routing number, payment amount and payment date, and generates an automated clearing house (ACH) payment to the recipient's specified account. If the transfer is made between two accounts at the same bank, internal processes not requiring ACH may be used to transfer money between accounts. The system 100 thus enables recipients to have their funds deposited into a checking, savings or other deposit account automatically. The P2P system 100 can utilize instant account verification rather than requiring two small deposits for verification, for example. This exemplary process is significantly more streamlined than a conventional process in which the recipient and the account must undergo a comprehensive verification that may take several days to complete. As a result, the likelihood that the P2P system 100 will be used by senders and recipients can be greatly enhanced.

If the recipient elects to receive the payment into his or her credit or debit card account, then the receive module 103 may send a web page that queries the recipient for his or her credit card or debit card account number, expiration date, and card verification value (CVV) number, as shown in FIG. 4. These numbers are generally readily accessible, as many people travel carrying one or more credit or debit cards. Hence, anyone with a credit or debit card can pull out the card, enter the foregoing information, and receive a P2P payment as a credit on his or her credit card statement or a deposit into his or her debit card account.

If the recipient chooses a credit card or debit card from the same bank as the sender's bank, then that bank executes the transfer from the sender's source account (serviced by the source account server 104) to the recipient's credit card or debit card account serviced by the card processing server 106. Transfers to the recipient's credit card or debit card account can be fulfilled using various options, such as initiating a manual adjustment or statement credit on the recipient's account.

If the recipient chooses a credit card or debit card at a bank that is different from the sender's bank, a transaction can be sent through the payment networks (e.g, Visa, Mastercard, Discover, American Express).

Referring again to FIG. 2, the receive module 103 includes a component for enabling the recipient 130 to receive his or her payment via a third party (3P) P2P platform or system, such as PayPal or Dwolla. The third party P2P system may be hosted on the server 160 shown in FIG. 1. The sender's bank will have configured the interoperability between its P2P system 100 and the third party P2P system 160. FIG. 4 shows an example of a user interface that may be transmitted by the receive module 103 to the recipient's mobile device 132. As shown in FIG. 4, the recipient may select a third party P2P service such as PayPal or Dwolla where the recipient already has an account. In this case, the message to the recipient may simply state that the specified payment amount (e.g., $20.00 in the example of FIG. 4) will be transferred to the recipient's PayPal account identified with a name or by an email address as the username of the recipient, for example. The recipient need only specify an email address or phone number and indicate that it is linked to a particular third party P2P service, such as PayPal or Dwolla. The sender's bank will have previously configured the interoperability between the P2P system 100 of the sender's bank and the third party P2P system 160.

Figure 5:
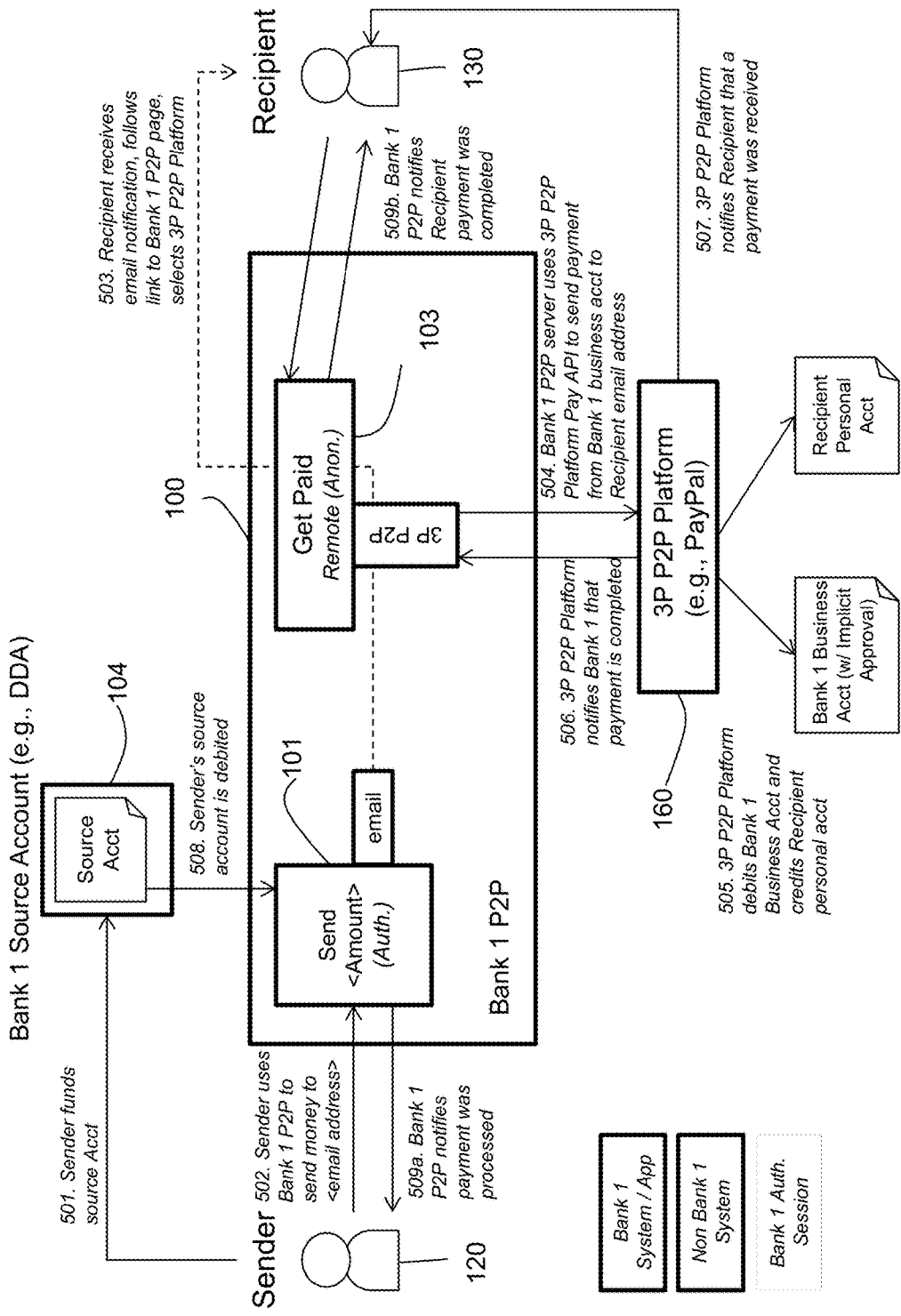
FIG. 5 is an architecture diagram showing an example system architecture and process for receiving a P2P payment via a third party P2P platform.

In order to enable transmission from the sender's P2P account at the sender's bank to the recipient's third party P2P account, the P2P system 100 may be appropriately configured to execute a number of steps as shown in FIG. 5. FIG. 5 is an architecture diagram showing the process for receiving money via a third party P2P service. First, in step 501, the sender funds the source account (e.g., the sender's checking account). Next, in step 502, the sender logs on to the P2P system, enters his or her username and password, the payment amount, payment date, and, in this example, the email address of the recipient. Although not shown in FIG. 5, the send module 101 will typically be configured to allow the sender to specify text message (mobile phone number), NFC, or QR code as the method for notifying the recipient of the payment. When the sender hits the "Send Money" button, the send module 101 sends an email message to the recipient's personal computing device. In step 503, the recipient receives an email message that includes a link to a P2P webpage of the sender's bank generated by the receive module 103.

In this example, also in step 503, the recipient elects to receive the payment by third party P2P system and provides an account identifier for the selected third party P2P system. The P2P system 100 of the sender's bank performs a validation check on the account identifier for the recipient, e.g. the email address entered or identified by the recipient associated with his or her third party P2P system. Before transferring funds, the sender's bank performs a validation check to ensure that the recipient has identified a valid account, e.g., there is an account at the third party P2P system for the identifier provided by the recipient, and that the account belongs to the recipient, e.g., by performing a name match.

In step 504, the P2P server 100 of the sender's bank uses an application programming interface (API) of the third party P2P system to transmit the payment from a business account established by the sender's bank at the third party P2P system to the account of the recipient. One example of this API is PayPal's "Pay API." In step 505, the third party P2P system debits the designated business account established by the sender's bank at the third party P2P system and credits the recipient's personal account at the third party P2P system for the amount of the transaction specified by the sender.

In step 506, the third party P2P system notifies the sender's bank that the payment has been completed, and in step 507 the third party P2P system notifies the recipient that a payment was received into the recipient's account. In step 508, the sender's bank debits the sender's account for the amount of the payment. In step 509*a*, the sender's bank P2P system notifies the sender that the payment was processed. In step 509*b*, The sender's bank P2P system notifies the recipient that the payment has been completed.

The process illustrated in FIG. 5 can provide the advantage that a recipient can use his or her existing third party P2P account to receive a P2P payment originating from the sender's bank. Upon receiving notice of the intended payment, such as by email, text, NFC, or QR code, the recipient need only specify his or her third party P2P account as the destination for the funds sent by the sender. The recipient does not need to establish an account with the sender's bank and P2P system. The sender's bank can enable this process to occur by establishing a designated business account at the sender's bank to pay the third party P2P system, and using an API to allow the third party P2P system to debit that designated business account by a specified amount upon receiving instructions to do so from the sender's bank. In this way, the process of receiving a P2P payment for a recipient having a third party P2P account is significantly streamlined, encouraging adoption of the sender's P2P system.

Another advantage that exemplary embodiments of the invention can provide is that the money transfer can be executed at the same or nearly the same speed as a P2P payment transaction within the same P2P system. That is, because the sender's bank has established and funded a business account at the third party P2P system, when the sender's bank chooses to execute the payment transaction, it simply uses the API to affect a transfer within the third party P2P system, from the sender's bank business account to the recipient's account. Accordingly, from the perspective of the recipient, the P2P payment is made at the same speed or at nearly the same speed as a P2P payment originating at the third party P2P system.

Although not shown explicitly in FIG. 2, 4 or 5, if the recipient is also an account holder in the P2P system of the sender's bank, then the P2P system 100 will allow the recipient to specify a default account for receiving P2P payments. For example, the recipient may elect to specify that all P2P payments transmitted and received within the same bank be deposited into the recipient's designated DDA (104) or credit card account (106) at that bank.

Referring again to FIG. 2, the sender's bank P2P system 100 can provide the recipient 130 yet another option for receiving a payment from the sender 120. The receive module 103 includes a merchant electronic gift certificate option that the recipient can select. Merchant electronic gift certificates are offered by retailers such as Starbucks and Amazon. Particularly if the amount of the P2P payment is relatively small, the recipient may elect to receive the payment in the form of a merchant electronic gift certificate. FIG. 4 illustrates an example of a user interface that the receive module 103 may send to the recipient's personal computing device 132. As shown in FIG. 4, one of the recipient's options is "Gift Cards," and in this example the recipient may select "Starbucks Pass," "Amazon eCertificate," or "Select from others." If the recipient elects Starbucks Pass, a Starbucks Pass of the appropriate amount is created and added to the recipient's Passbook. If the recipient elects "Amazon eCertificate" an Amazon Code providing access to an electronic gift certificate of the appropriate amount is emailed to the recipient's email address. According to various embodiments of the invention, the recipient is allowed to choose the merchant electronic gift certificate fulfillment method (e.g., merchant code or account number, QR code, bar code) and select from a list of available merchants. As one example, the recipient can select one of the fulfillment options for use with his or her mobile device, e.g., present a QR code using the mobile device to a point of sale terminal at Starbucks to redeem the merchant electronic gift certificate for a preferred Starbucks drink.

Figure 6:
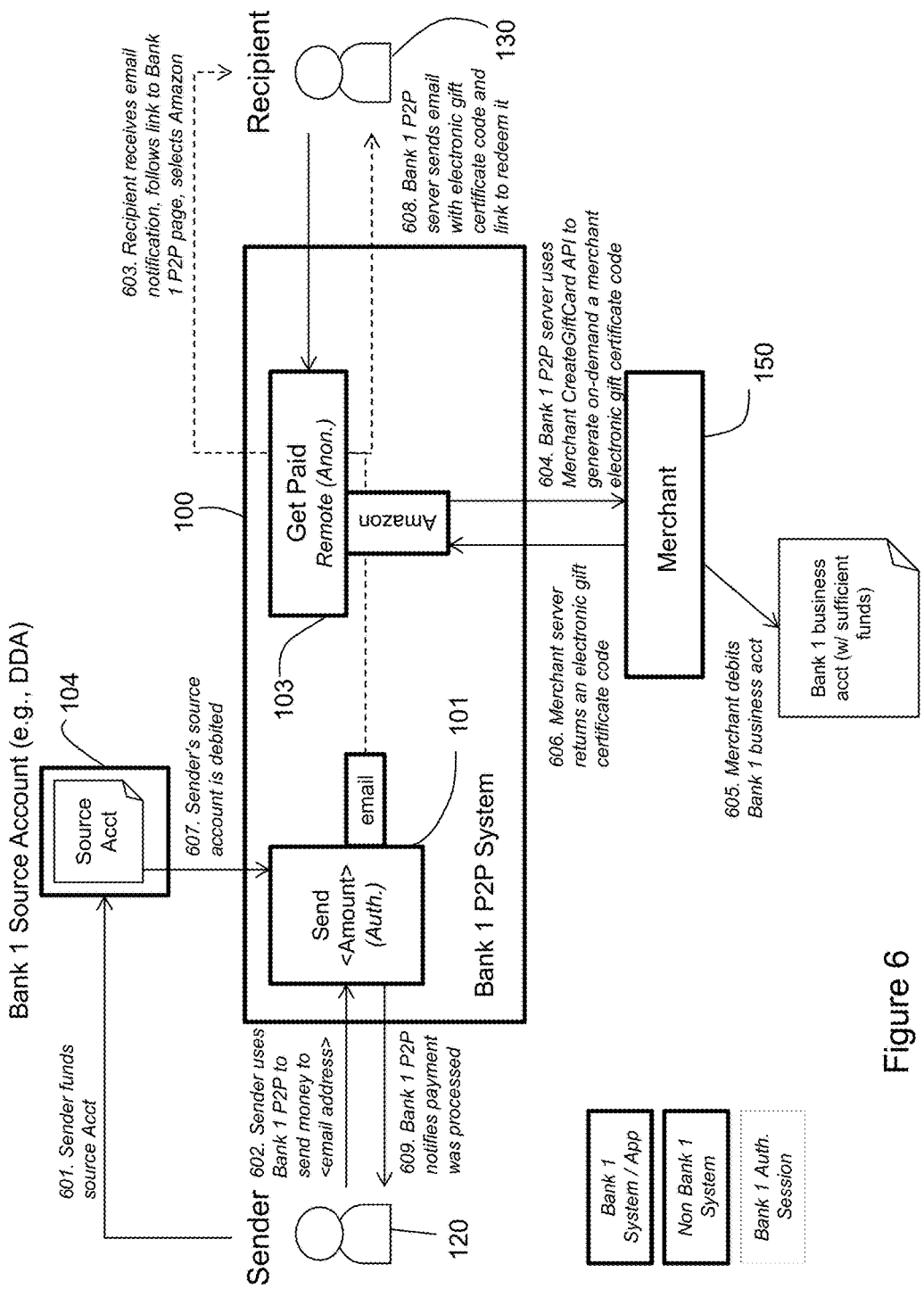
FIG. 6 is an architecture diagram showing an example system architecture and process for receiving a P2P payment via an electronic gift certificate issued by a merchant.

FIG. 6 is a diagram showing an example of the architecture and process of receiving an electronic gift certificate as payment from the sender's P2P system. As shown in FIG. 6, the process begins in step 601 with the sender funding the source DDA account. Next, in step 602, the sender logs on to the P2P system 100, enters his or her username and password, the payment amount, payment date, and, in this example, the email address of the recipient. When the sender hits the "Send Money" button, the send module 101 sends an email message to the recipient's personal computing device 132. In step 603, the recipient receives the email message, which includes a link to a P2P webpage of the sender's bank generated by the receive module 103. The notification to the recipient can also be transmitted in the form of a text message, NFC, QR code, Bluetooth Low Energy, biometric authentication, social network, or other transmission method.

In this example, also in step 603, the recipient clicks on the link to obtain a webpage from the receive module 103 of the sender's P2P system and elects to receive the payment by electronic gift certificate. In step 604, the P2P server 100 of the sender's bank uses an application programming interface (API) of the third party merchant's electronic gift certificate server 150 to generate on-demand an electronic gift certificate code. According to one example, the P2P system of the sender's bank uses Amazon's CreateGiftCard API to generate on demand an Amazon electronic gift certificate code. In step 605, the third party electronic gift certificate server then debits a business account at the sender's bank designated for the third party electronic gift certificate server in an amount equal to the value of the electronic gift certificate. The integration of merchant electronic gift certificates can be configured as a merchant specific integration (e.g., Amazon) or through a third party merchant electronic gift certificate aggregator such as Blackhawk. In step 606, The third party electronic gift certificate server then returns the electronic gift certificate code to the receive module 103 of the sender's bank P2P system. Next, in step 607, the sender's source account (e.g., DDA) is debited by the sender's bank in the amount of the electronic gift certificate. In step 608, the receive module 103 then sends an email message to the recipient with the electronic gift certificate code and a link to redeem it. Next, in step 609, the send module 101 notifies the sender that the payment was processed.

The process illustrated in FIG. 6 can provide the advantage that a recipient can easily receive payment in the form of an electronic gift certificate that is redeemable immediately. For example, the recipient may receive an Amazon eCertificate on his or her tablet computer, visit the Amazon website on the tablet computer, and purchase an electronic book or any other product offered by Amazon by redeeming the electronic gift certificate. The recipient does not need to go through any other steps to receive the payment, which may enhance the adoption of the sender's P2P system 100. This embodiment can enable instant access to funds and also provide solutions for children or others without bank accounts.

Figure 7:
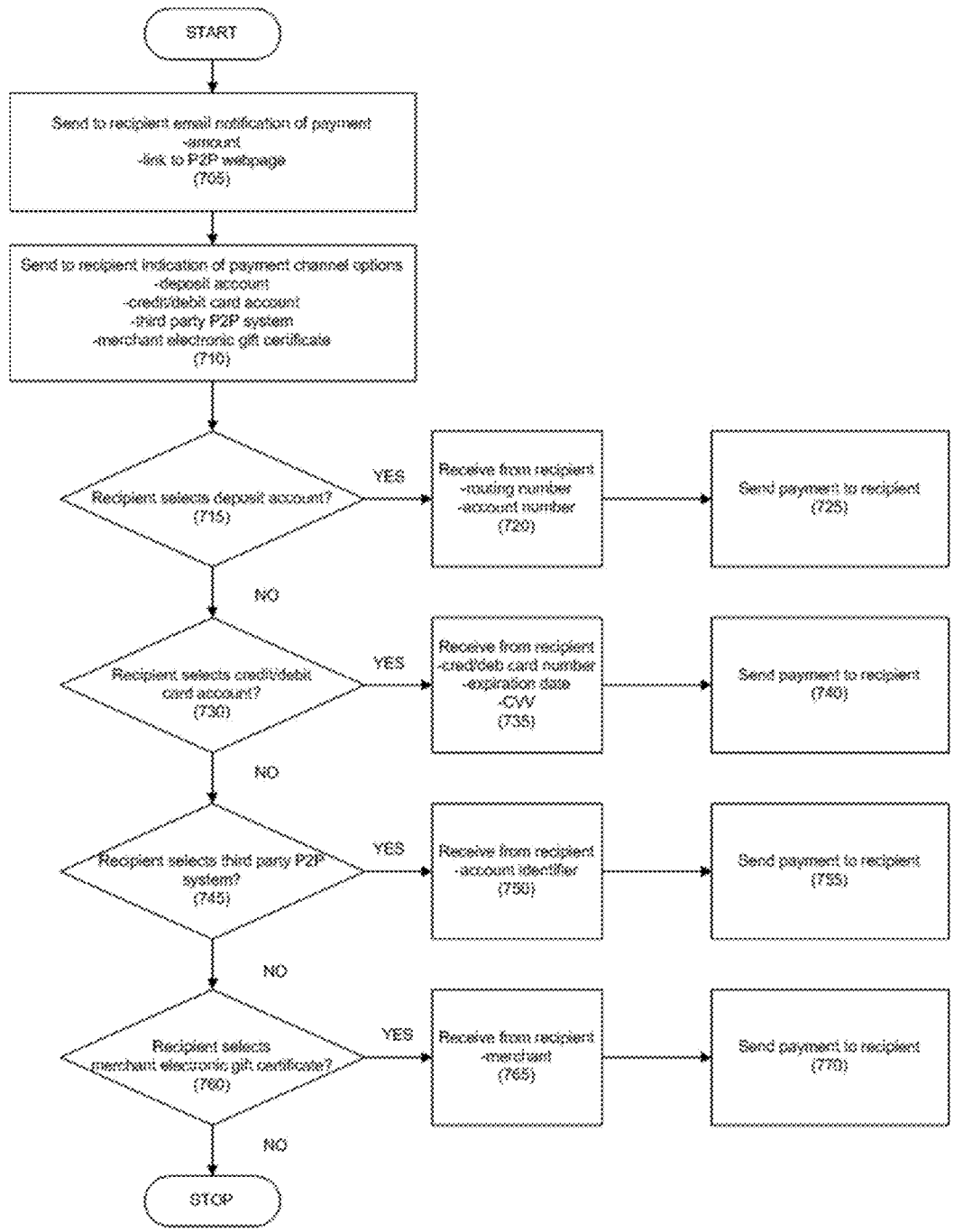
FIG. 7 is a flow chart showing an example method for receiving a P2P payment.

FIG. 7 is a flow chart that illustrates a method according to one embodiment of the invention. The method starts at step 705 where the P2P system 100 sends to the recipient a notification of a payment, including the amount of the payment and a link to the P2P webpage of the sender's bank. In step 710, the P2P system 100 of the sender's bank sends a web page to the recipient which identifies a number of options for transmitting the payment, including a deposit into the recipient's deposit account, a credit on the recipient's credit card balance statement or deposit into the recipient's debit card account, a payment made to the recipient's account at a third party P2P system, or in the form of a merchant electronic gift certificate. In step 715, if the recipient selects deposit account, then in step 720, the P2P system 100 receives from the recipient his or her routing number and account number for the desired account. The P2P system 100 then deposits the payment into the recipient's deposit account in step 725.

If the recipient selects a credit card or debit card account in step 730, then in step 735, the P2P system 100 receives from the recipient his or her credit card or debit card number, expiration date, and CVV. The P2P system 100 then applies a credit to the recipient's credit card statement or a deposit into the recipient's debit card account in step 740.

If the recipient selects a third party P2P system in step 745, then in step 750, the P2P system 100 receives from the recipient an account identifier for the third party P2P system. The P2P system 100 will have been preconfigured to be interoperable with certain authorized third party P2P systems. The P2P system 100 then sends a payment to the recipient via the recipient's third party P2P system in step 755.

If the recipient selects a merchant electronic gift certificate in step 760, then in step 765, the P2P system 100 receives from the recipient an identification of the merchant from a list of available merchants. The P2P system 100 may also be configured to allow the recipient to choose the electronic gift certificate fulfillment method (e.g., merchant code or account number, QR code, bar code). The P2P system 100 then instructs the merchant to generate an electronic gift certificate code or execute another fulfillment method of transmission and the P2P system 100 sends the merchant electronic gift certificate code or other transmission (e.g., QR code or bar code) to the recipient in step 770.

If the recipient does not select any payment channel option, the process stops.

Although the foregoing description has focused primarily on a retail bank as providing the P2P system 100, the system may be utilized by other types of entities such as standalone P2P services from providers such as PayPal, Google, Square, and Dwolla, or other similar service providers.

While the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers shown by FIG. 1 may be stored and cataloged in one or more databases, which may comprise or interface with a searchable database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications networks, e.g., 110, 112 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL)

connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications networks, e.g., 110, 112 in FIG. 1, may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 100 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 110, 112, may comprise a satellite communications network, such as a direct broadcast communication system (DBS) having the requisite number of dishes, satellites and transmitter/receiver boxes, for example. Communications network, e.g., 110, 112, may also comprise a telephone communications network, such as the Public Switched Telephone Network (PSTN). In another embodiment, communication network 120 may comprise a Personal Branch Exchange (PBX), which may further connect to the PSTN.

Although examples of user communication devices 122, 132 are shown in FIG. 1, exemplary embodiments of the invention may utilize other types of communication devices whereby a user may interact with a network that transmits and delivers data and information used by the various systems and methods described herein. The user communication device may include a microprocessor, a microcontroller or other device operating under programmed control. The user communication device may further include an electronic memory such as a random access memory (RAM) or electronically programmable read only memory (EPROM), a storage (which is typically non-transitory) such as a hard drive, a CDROM or a rewritable CDROM or another magnetic, optical or other media, and other associated components connected over an electronic bus, as will be appreciated by persons skilled in the art. The user communication device may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The user communication device may also include a network-enabled appliance, a browser-equipped or other network-enabled cellular telephone, or another TCP/IP client or other device.

As described above, FIG. 1 includes a number of servers 100, 104, 106, 150, 160, 170 and user communication devices 122, 132 each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, or simply software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (non-transitory computer readable medium containing program code instructions executed by the processor) for executing the methods described herein. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the communication devices 122, 132. As used herein, a user interface may include any hardware, software, or combination of hardware and software used by the processor that allows a user to interact with the processor of the communication device. A user interface may be in the form of a dialogue screen for example. A user interface may also include any of a mouse, touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface is any device that provides communication between a user and a processor. The information provided by the user to the processor through the user interface may be in the form of a command, a selection of data, or some other input, for example.

As discussed above, a user interface is utilized by the processor that performs a set of instructions such that the processor processes data for a user. The user interface is typically used by the processor for interacting with a user either to convey information or receive information from the user. However, it should be appreciated that in accordance with some embodiments of the invention, it is not necessary that a human user actually interact with a user interface used by the processor. Rather, it is contemplated that the user interface of the invention might interact, i.e., convey and receive information, with another processor, rather than a human user.

Although the embodiments of the present invention have been described herein in the context of a particular implementation in a particular environment for a particular purpose, those skilled in the art will recognize that its usefulness is not limited thereto and that the embodiments of the present invention can be beneficially implemented in any number of environments for any number of purposes.

What is claimed is:

1. A computer-implemented method for sending a person to person (P2P) payment from a sender to a recipient comprising:

electronically transmitting, via a P2P computer server comprising at least one computer processor, to the recipient through a communications channel-selected by the sender, the communications channel consisting of at least one of: email, text message, quick response (QR) code, and near field communication (NFC), a notification of the payment from the sender, the notification including an amount of the payment and a link to a P2P payment platform of a financial entity of the sender that is different from a P2P payment platform at which the recipient receives the payment;

after the recipient selects the link in the notification, electronically transmitting, via the P2P computer server, to the recipient an interface detailing funds transfer options including: an option to transfer of funds to a checking or savings account with a request for an account number and routing number, an option to transfer of funds to a transaction card account with a request for a card number, expiration date, and a card verification value (CVV), an option to transfer of funds to a third party P2P system with a request for an account identifier, and an option to transfer of funds in the form of a merchant electronic gift certificate with a request for identification of the desired merchant;

receiving from the recipient electronically, via the P2P computer server, a selection as to one of the funds transfer options whereby in the case of a deposit account, the recipient provides the requested routing number and account number, in the case of a transaction card account, the recipient provides the requested card number, expiration date, and card verification value (CVV), in the case of a third party P2P system, the recipient provides the requested account identifier, or in the case of a merchant electronic gift certificate, the recipient identifies the desired merchant; and electronically transmitting, via the P2P computer server, the payment to the recipient via the recipient's selected funds transfer option without requiring the recipient to open a new account or verify an existing account, wherein the sender selects from a plurality of sending options comprising each of: near field communication, quick response code, an email address of the recipient, mobile phone number, and via social network.

2. The method of claim 1, wherein the selected communication channel comprises at least one of: Bluetooth Low Energy, biometric authentication, and social network.

3. The method of claim 1, wherein the deposit account comprises a savings account or a checking account.

4. The method of claim 1, wherein the transaction card account comprises a credit card account or a debit card account.

5. The method of claim 1, wherein the step of receiving from the recipient electronically a selection as to one of the payment channel options is carried out, at least in part, over a wireless communication channel.

6. A computer implemented system for sending a person to person (P2P) payment from a sender to a recipient comprising:

an electronic storage device; and a computer processor that is programmed to:

electronically transmit, via a P2P computer server, to the recipient through a communications channel selected by the sender, the communications channel consisting of at least one of: email, text message, quick response (QR) code, and near field communication (NFC), a notification of the payment from the sender, the notification including an amount of the payment and a link to a P2P payment platform of a financial entity of the sender that is different from a P2P payment platform at which the recipient receives the payment;

after the recipient selects the link in the notification, the computer processor is further programmed to electronically transmit, via the P2P computer server, to the recipient an interface detailing funds transfer options including an option to transfer of funds to a checking or savings account with a request for an account number and routing number, an option to transfer of funds to a transaction card account with a request for a card number, expiration date, and a card verification value (CVV), an option to transfer of funds to a third party P2P system with a request for an account identifier, and an option to transfer of funds in the form of a merchant electronic gift certificate with a request for identification of the desired merchant;

receive, from the recipient electronically, via the P2P computer server, a selection as to one of the funds transfer options whereby in the case of a deposit account, the recipient provides the requested routing number and account number, in the case of a transaction card account, the recipient provides the requested card number, expiration date, and card verification value (CVV), in the case of a third party P2P system, the recipient provides the requested account identifier, or in the case of a merchant electronic gift certificate, the recipient identifies the desired merchant; and electronically transmit, via the P2P computer server, the payment to the recipient via the recipient's selected funds transfer option without requiring the recipient to open a new account or verify an existing account, wherein the sender selects from a plurality of sending options comprising each of: near field communication, quick response code, an email address of the recipient, mobile phone number, and via social network.

7. The system of claim 6, wherein the selected communication channel comprises at least one of: Bluetooth Low Energy, biometric authentication, and social network.

8. The system of claim 6, wherein the deposit account comprises a savings account or a checking account.

9. The system of claim 6, wherein the transaction card account comprises a credit card account or a debit card account.

10. The system of claim 6, wherein the system is designed to receive wireless transmissions from a mobile device of the recipient.

11. A non-transitory computer readable medium containing program instructions for executing a P2P payment transaction between a sender and a recipient over a network, wherein execution of the program instructions by one or more processors of a computer system causes the one or more processors to carry out the steps of:

electronically transmitting, via a P2P computer server comprising at least one computer processor, to the recipient through a communications channel selected by the sender, the communications channel consisting of at least one of: email, text message, quick response (QR) code, and near field communication (NFC), a notification of the payment from the sender, the notification including an amount of the payment and a link to a P2P payment platform of a financial entity of the sender that is different from a P2P payment platform at which the recipient receives the payment;

after the recipient selects the link in the notification, electronically transmitting, via the P2P computer server, to the recipient an interface detailing funds transfer options including an option to transfer of funds to a checking or savings account with a request for an account number and routing number, an option to transfer of funds to a transaction card account with a request for a card number, expiration date, and a card verification value (CVV), an option to transfer of funds to a third party P2P system with a request for an account identifier, and an option to transfer of funds in the form of a merchant electronic gift certificate with a request for identification of the desired merchant;

receiving from the recipient electronically, via the P2P computer server, a selection as to one of the funds transfer options whereby in the case of a deposit account, the recipient provides the requested routing number and account number, in the case of a transaction card account, the recipient provides the requested card number, expiration date, and card verification value (CVV), in the case of a third party P2P system, the recipient provides the requested account identifier, or in the case of a merchant electronic gift certificate, the recipient identifies the desired merchant; and electronically transmitting, via the P2P computer server, the payment to the recipient via the recipient's selected funds transfer option without requiring the recipient to open a new account or verify an existing account, wherein the sender selects from a plurality of sending options comprising each of: near field communication, quick response code, an email address of the recipient, mobile phone number, and via social network.

\* \* \* \* \*